Nov. 12, 1957  P. B. HAYS  2,812,786
SAW TABLE WITH ATTACHMENTS FOR USING POWER DRIVEN HAND SAW
Filed March 7, 1955  2 Sheets-Sheet 1
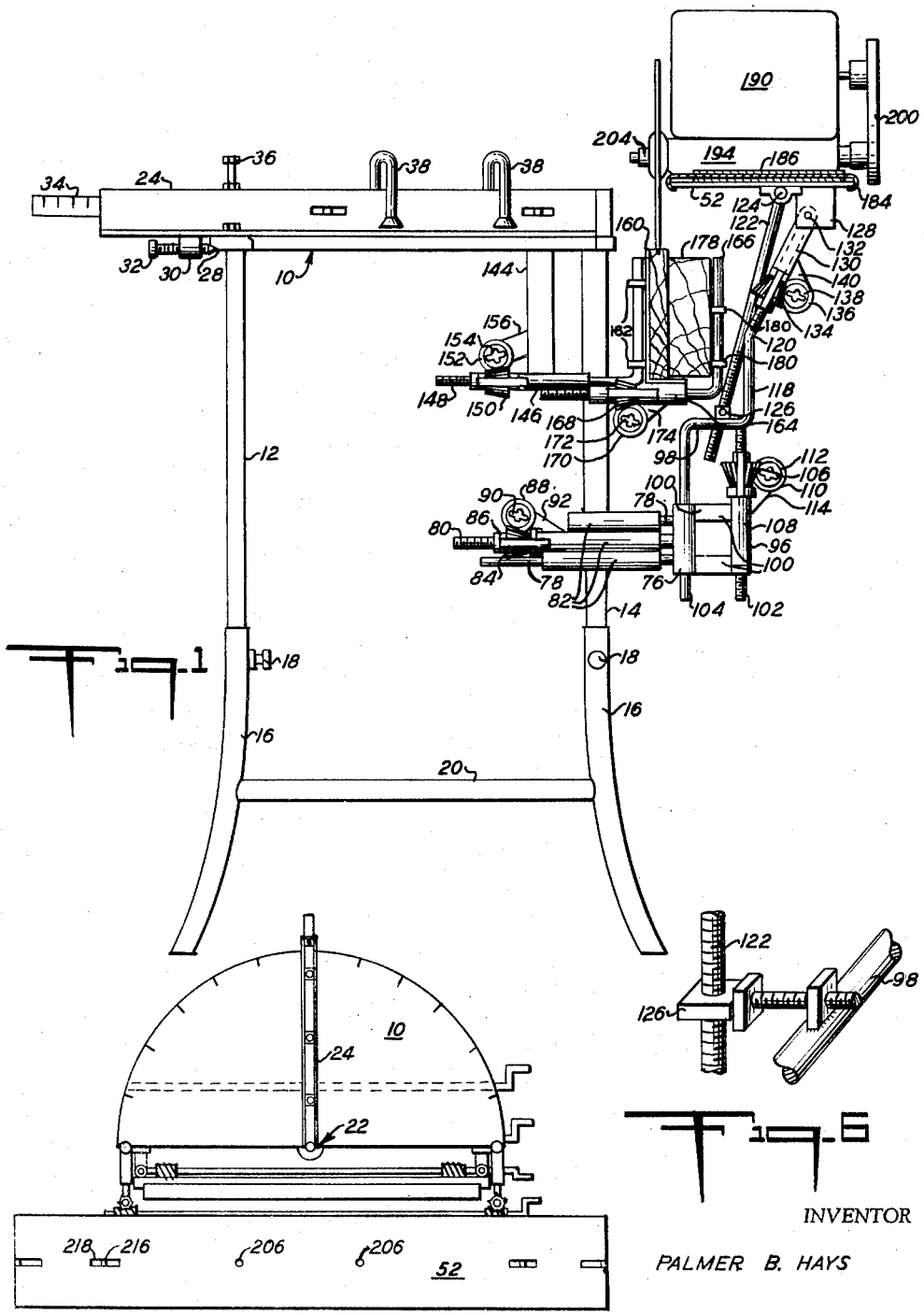
INVENTOR
PALMER B. HAYS
BY
Parker and Walsh
ATTORNEY

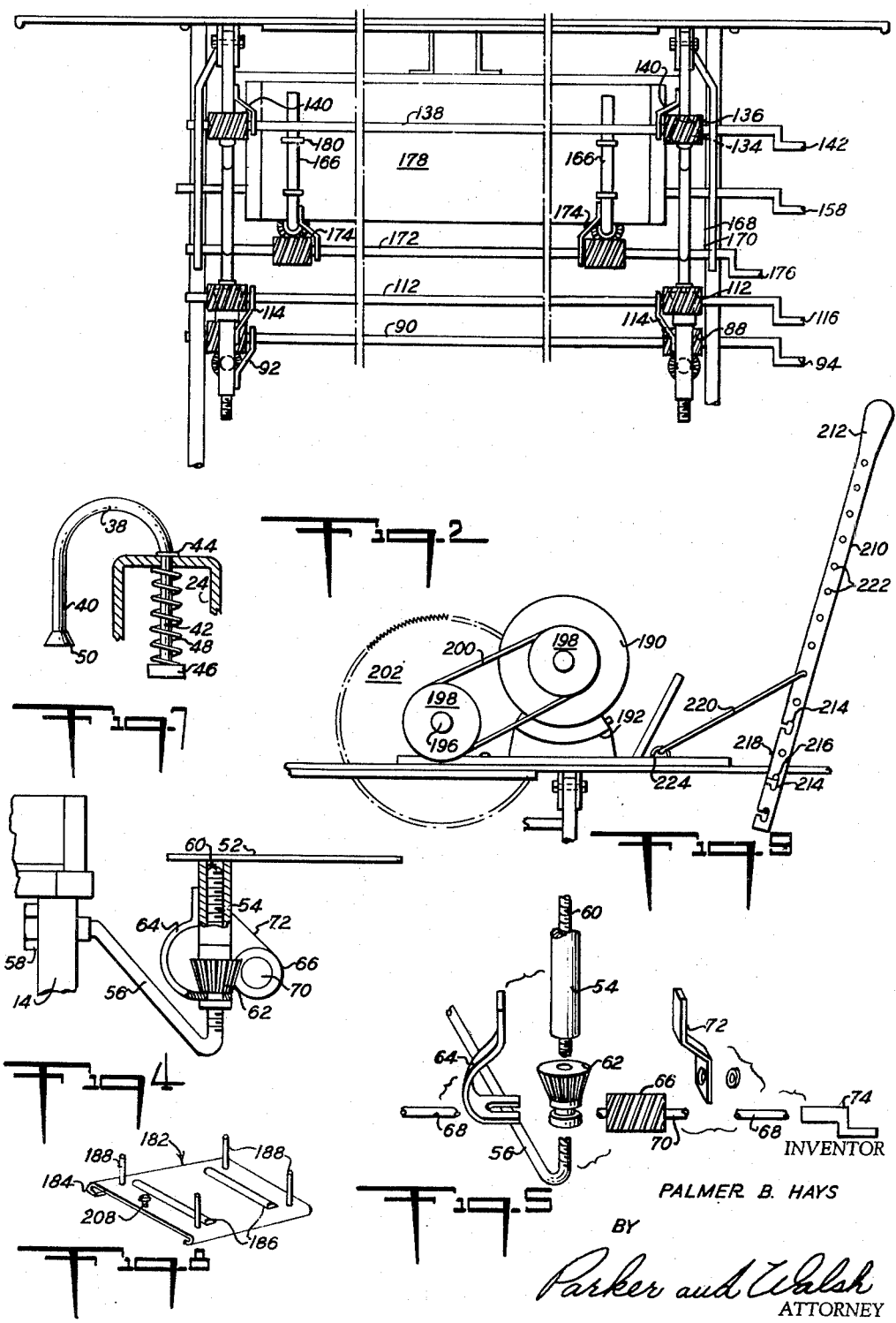

United States Patent Office 2,812,786
Patented Nov. 12, 1957

2,812,786

SAW TABLE WITH ATTACHMENTS FOR USING POWER DRIVEN HAND SAW

Palmer B. Hays, Sundown, Tex.

Application March 7, 1955, Serial No. 492,452

6 Claims. (Cl. 143—6)

This invention relates to a table for use with an electric hand saw.

Portable electric saws have almost completely replaced the old-fashioned hand saw in the tool kits of working carpenters, so far as steady usage is concerned. However, because an electric hand saw cannot be used in a conventional miter box, the carpenter must either continue to carry with him an ordinary hand saw or he must approximate his angular cuts with the aid of his eye. Some miter boxes have been devised for use with an electric hand saw but they have been either too limited in their capabilities, considering their cost, or much too complex considering the limited use that the owner can make of them.

The device of this invention is highly versatile in its many applications yet comparatively inexpensive in construction. It is so arranged that it may be used either as a shop tool or on a job away from the shop. When used on the job, it is so arranged that the saw can be readily transferred from the table to ordinary use and back so that the saw is not tied up for a single type of use.

The table may be separated into portable units so that it may be transported readily to the shop and used there in a semi-permanent installation. When used in the shop, the table makes it possible to use the saw for substantially all the uses to which a table saw may be used.

The invention may best be understood by reference to the accompanying drawings wherein:

Figure 1 shows an end elevation of the device with certain portions shown in cross-section;

Figure 2 shows a side elevation with portions being omitted for clarity;

Figure 3 (Sheet 1) is a plan view with portions omitted;

Figure 4 is an enlarged view of a modification corresponding to Figure 1, parts being shown in cross-section;

Figure 5 is a side view of some of the parts shown in Figure 4, the parts being shown disassembled, to display their relationship one to the other;

Figure 6 (Sheet 1) is an enlarged detail of a portion of Figure 1;

Figure 7 is another enlarged detail of Figure 1, the showing being at right angles to that found in Figure 1 and parts thereof being in section;

Figure 8 shows a reduced view of a modification of the carriage; and

Figure 9 is a side elevation to an enlarged scale of the saw and carriage, showing an attachment for use thereof.

Referring to the drawings, the numeral 10 refers to a table top supported by an outside leg 12 and two inside legs 14. The legs 12 and 14 are tubular and have lower ends reduced in diameter and set into curved feet 16, which, at the tops thereof, are of tubular shape corresponding to the diameter of the legs. The reduced ends of the legs are held firmly in sockets in the feet by means of set screws 18. The feet are held rigidly together by means of cross braces 20, extending from one to the other. By means of the interfitting of the legs and feet, the assembly may be taken apart for greater ease in transportation. Also, the use of the spread apart feet, makes the table, when so set up, suitable for use on outdoor jobs, whereas the upper portion of the table may be carried indoors to a semi-permanent work shop installation where the lower ends of the legs 12 and 14 may be fixed in a different support.

The table top 10 is formed in the shape of a semicircle with the arcuate portion graduated from its two ends to the center, from zero to 90°. See Fig. 3. Along the diameter thereof, in the center, is a bearing 22 for fence 24 having a pivot pin extending into the bearing. The outer rim of the table top 10 is chamfered on its underside at 28. The outer portion of the fence 24 extends beyond the rim of the table top and carries on its underside the threaded bearing 30 provided with adjustable screw 32. When it is desired to fix the fence at any desirable point on the table top, it is set to position and the screw tightened so that the pointed end thereof engages the chamfer.

If desired, the fence 24 may be provided with a rectangular bore in which is slide rule 34. The rule may be fixed in place of means of set screw 36 and in this way, the cutoff point of a piece of wood placed against the fence 24 may be indicated.

The fence 24 may be provided with two or more lumber holders made up of inverted U-members 38 having outer 40 and inner 42 arms. See Fig. 7. The inner arm 42 is arranged with upper stop 44 and lower stop 46, the latter being removable to enable the arm to pass through a bearing hole in the fence 24. A compression spring 48 fitted between the surface of fence 24 and the lower stop 46 tends to hold the member in a lowered position. The holder is provided with a rubber tipped outer finger 50 for engaging the piece of lumber to be held. The holder is free to rotate to either side of the fence, depending upon which side of the fence it is desired to hold the lumber. When it is desired to have the lumber holders out of the way, they may be pulled out against the action of spring 48 and the grip portions 50 allowed to make contact with the upper surface of the fence.

Arranged across the diameter of table top 10, is leaf 52. The leaf is spaced outwardly from the diameter and extends beyond the ends of the table top in both directions. As shown in Figure 4, the leaf 52 is supported in place by means of two hollow sleeves 54 secured to the underside thereof. These sleeves 54 slip over the upstanding portions of arms 56 which extend outwardly from legs 14, being bolted at 58 on the inner side of holes passing through the legs.

The upper portion 60 of arms 56 is threaded to receive cog nuts 62 so that as the nuts rise on upright 60 they lift leaf 52 by pressing against sleeves 54. The cog nuts 62 are held by retaining loops 64, the extensions of which are welded to sleeve 54. Rotation of cog nuts 62 is brought about by worms 66 secured to shaft 68 by means of Allen screws 70. The shaft 68 is supported in suitably bushed support plates 72 also welded to sleeve 54. The shaft 68 may be rotated in either direction by means of handle 74 which is detachable from shaft 68 and suitably interfitted with the shaft so that it may be attached at either end thereof.

The foregoing arrangement although satisfactory in providing vertical adjustment for the leaf, does not permit horizontal adjustment. For horizontal adjustment, as shown in Figures 1 to 3, I provide vertically arranged tube fitting 76 provided with two horizontally extending, unthreaded rods 78 and a threaded rod 80. Corresponding to these rods are three sleeves 82 welded to inside legs 14. Cog nuts 84 are positioned on the other ends of threaded rods 80 and held in place by means of retaining loops 86 passing around the circumferential slot in the cog nuts and welded to sleeves 82. The cog nuts are driven by means of worms 88 on shaft 90 which is supported by plates 92. Like shaft 68, shaft 90 is provided with a handle 94 which may be placed in either end of the shaft to operate it.

A sleeve 96 is connected to vertical tubes 76 by means of spacers 100. Sleeve 96 acts as a guide for threaded arm 102 and tube 76 acts as a guide for unthreaded arm 104, both extending downwardly from the intermediate portion of riser 98. Vertical movement of riser 98 is brought about by cog nut 106 on the threaded arm 102. As previously set out there is a retaining loop 108 for the cog nut 106 and the cog nut is driven by worm 110 carried on shaft 112 journaled in support plates 114 welded to sleeve 96. Turning of crank handle 116 effects vertical movement of riser 98. This controls the vertical movement of leaf 52 just as turning of crank handle 94 controls the horizontal movement.

The upper portion 118 of riser 98 is bent outwardly at 120 and the outer end thereof is threaded. A tie rod 122 is pivoted at 124 to the underside of leaf 52. The lower portion of the tie rod is threaded, fitting into nut 126 welded to the bent portion of riser 98.

Also affixed to the underside of leaf 52 is plate 128 and pivoted to it is sleeve 130 at point 132. Sleeve 130 receives the threaded upper portion 118 of the riser. The cog nut 134 on the riser is acted upon by worm 136 affixed to shaft 138 rotating in support plates 140 welded to sleeve 130. Turning of the crank handle 142 on the shaft 138 causes pivot point 132 to rotate about pivot point 124 to tilt leaf 52. If desired, a suitable indexing device may be mounted on the outer portion of the leaf to indicate the angle of tilt.

Welded to the underside of table top 10 are posts 144 to which in turn are welded sleeves 146. These sleeves receive in turn threaded angle rods 148 upon which are threaded cog nuts 150. These cog nuts are turned by worms 152 carried on shaft 154 and supported from plates 156 welded to posts 144. Rotation of crank handle 158 will cause the upright portion of angle rods 148 to move in and out with respect to the table. Carried on the angle rods 148 is jaw plate 160 by means of pairs of eyes 162 projecting out from the jaw plate.

Welded across the under leg of the jaw plate 160 are sleeves 164 which receive the lower, threaded portion of second angle rods 166. To the second angle rods 166 are threaded cog nuts 168 driven by worms 170 on shaft 172. The shaft 172 rotates in support plates 174 welded to sleeves 164. An oak plank face 178 provided with eyes 180 is slipped in place over the upright portions of second angle rods 166. Rotation of the handle 176 opens and closes the faces of an elongated vise formed of jaw plate 160 and oak plank 178. This vise forms a lumber rack for holding lumber fixed longitudinally with respect to leaf 52 just as the fence 24 holds the lumber crosswise with respect to the leaf.

Arranged to slide lengthwise on leaf 52 is shoe 182 provided with turned under channel guides 184 for guiding the shoe along the leaf. The shoe may have small diameter rollers 186 suitably journaled therein to reduce the friction of the movement of the shoe along the leaf. For use with standard models of electric hand power saws, a set of posts 188 (Fig. 8) may be secured to the shoe in a pattern suited to cooperate with companion holes in the electric power saw.

For heavier duty operation a motor 190 (Figs. 1 and 9) may be secured to block 192 on the upper side of the shoe. On the front end of the shoe is bearing block 194 for saw shaft 196. This shaft and the motor shaft are provided with pulleys 198 for V-belt 200. The shaft 196 is provided with a suitable saw blade affixed to the shaft in conventional manner with nut 204.

It will be apparent that the saw, whether a light duty commercial model or a heavy duty type, may be pushed along leaf 52 to make a cross cut of lumber held against fence 24. For the majority of work, the fence will be fixed at the 90° point for right angle cuts. However, cuts at any other desired angle may be obtained by movement of the fence 24 about its pivot 26, the fence being fixed in place by screw 32. Since the leaf 52 may be tilted as well, compound angular cuts may be made in the lumber as desired.

Rip cuts are made in lumber by holding the lumber in the lumber rack below the surface of table top 10 between the faces of jaw plate 160 and oak face 178. If the piece to be ripped is longer than the faces of the lumber rack, a threaded hole 206 (Fig. 3) is provided in leaf 52 for receiving thumb screw 208 (Fig. 8) through the shoe 182. In this way, the shoe can be fixed in one position and the lumber to be ripped can be pushed through the lumber rack beneath the saw plate.

Normally, on the lighter cuts, the saw may be pushed through by means of the handle provided therewith. For unusually heavy cuts there is provided a detachable arm 210 (Fig. 9) having a handle 212 at the outer end thereof. The inner end has a series of T slots 214 which are adapted to fit bars 216 welded across the underside of slots 218 in the leaf 52. Yoke rods 220 of varying lengths and having hooked ends may be fitted in spaced holes 222 in the arm 210 and eyes 224 attached to the shoe 182. In this manner, the saw blade 202 may be steadily and firmly brought into contact with the lumber to be cut.

It will be seen that the embodiment of my invention is widely useful. First of all, it is equally useful for right and left handed persons. The saw shoe may be operated in either direction along the length of the leaf. The handles for the various worm drive shafts fit equally well on each end of the shaft so that the controls may be moved from one to the other. Lumber may be placed on either side of the fence and held with equal facility.

Ordinary right angle cross cuts are made with the fence at right angles to the leaf. Angular cuts may be made both by moving the fence and by tilting the leaf. As will be readily apparent, the choice of the particular method of accomplishing it depends upon the relationship of the cut to the larger dimension of the stock to be cut. Regulating the height of the leaf and the horizontal adjustment with respect to the table, makes it possible to deal with widely varying sizes of stock.

Provision of the lumber vise between the table and the leaf makes it possible to handle long rip cuts, both to merely rip stock apart and also to do slotting and analogous work.

By simply changing the mounting device on the shoe, the arrangement can be modified to be used with any model of hand saw and, since the heavier powered saw is separately arranged, it is possible for the user to operate with the lighter powered saw until he needs the heavier one, purchasing it at a later date if he so desires. By means of this arrangement the user is afforded an economical yet versatile tool.

I claim:

1. A table device for use with a power driven handsaw including: legs for supporting the table; a table top supported thereon; a pivot at one side thereof, a fence extending across the table and mounted for swinging about said pivot, interfitting means on the fence and table for adjustably securing the fence to the table; support arms extending from the table structure outwardly from the pivot side, an elongated leaf, extending the length of the pivot side and spaced outwardly from the table top to provide a saw slot between the table top and the leaf; a plurality of slots extending lengthwise in said leaf, a bearing rod secured in each of said slots and extending cross-wise of said slot, a removable hand lever with spaced bearing slots, along its length, for pivoting the lever about the rods; means connecting the leaf and the support arms for supporting the leaf, said connecting means being adjustable for varying the height of the leaf; carriage means interfitting and engaging the leaf for supporting a power driven handsaw for movement along the leaf, cooperative means for holding the carriage means against sidewise motion on the leaf while permitting free movement along the length thereof, interfitting means for fixing the saw to the carriage and attachment links for connecting the free end of the hand lever with the saw carriage for assisting the movement of the saw carriage.

2. A table device for use with a power driven handsaw including: legs for supporting the table; a table top supported thereon; a pivot at one side thereof, a fence extending across the table and mounted for swinging about said pivot, interfitting means on the fence and table for adjustably securing the fence to the table; support arms extending from the table structure outwardly from the pivot side, an elongated leaf, extending the length of the pivot side and spaced outwardly from the table top to provide a saw slot between the table top and the leaf; means connecting the leaf and the support arms for supporting the leaf, including a pair of vertical tubular fittings secured to one of the leaf or leg structure, the outer end of the fittings having bearing surfaces, threaded rods secured to the other of the leaf or leg structure, said rods being adapted to be received within said tubular fittings, an internally threaded gear, threaded upon each of said rods and bearing upon said bearing surface, a crankshaft suspended on the tubular fittings and a pair of worms mounted on the crankshaft in engagement with gears whereby turning of the crank moves the gears along the rods to produce lengthwise relative movement of the rods and tubular fittings and carriage means interfitting and engaging the leaf for supporting a power driven handsaw for movement along the leaf, cooperative means for holding the carriage means against sidewise motion on the leaf while permitting free movement along the length thereof, and interfitting means for fixing the saw to the carriage.

3. The structure of claim 2 wherein the gears are provided with annular grooves and a yoke, secured to the tubular fittings, engages the groove.

4. The structure of claim 2 wherein the crankshaft is fitted with a removable crank operating from either end of the shaft.

5. The combination of claim 2 wherein an elongated vise is located below and between the table top and leaf whereby work may be held therein for rip cuts.

6. The combination of claim 5 wherein the vise assembly may be moved across the saw slot from the table top toward the leaf and back.

References Cited in the file of this patent

UNITED STATES PATENTS

| | | |
|---|---|---|
| 141,975 | Xander | Aug. 19, 1873 |
| 306,888 | Williams | Oct. 21, 1884 |
| 866,678 | Pearson | Sept. 24, 1907 |
| 1,032,002 | Hassler | July 9, 1912 |
| 1,457,492 | Bloodgood | June 5, 1923 |
| 1,608,558 | Hannah | Nov. 30, 1926 |
| 1,842,630 | Rodning | Jan. 26, 1932 |
| 1,894,010 | Tautz | Jan. 10, 1933 |
| 2,306,512 | Whitney | Dec. 29, 1942 |
| 2,396,961 | Meredith | Mar. 19, 1946 |
| 2,559,283 | Dick | July 3, 1951 |
| 2,601,878 | Anderson | July 1, 1952 |